Sept. 27, 1960          G. W. DEAN          2,954,204
DIAPHRAGM VALVE
Filed March 23, 1956          2 Sheets-Sheet 1
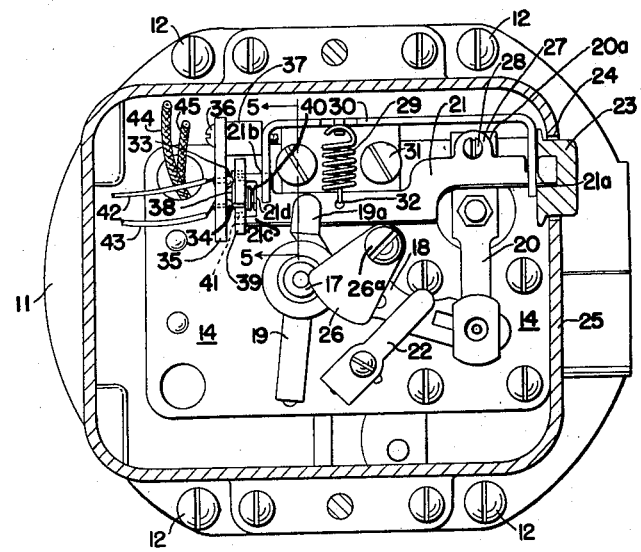
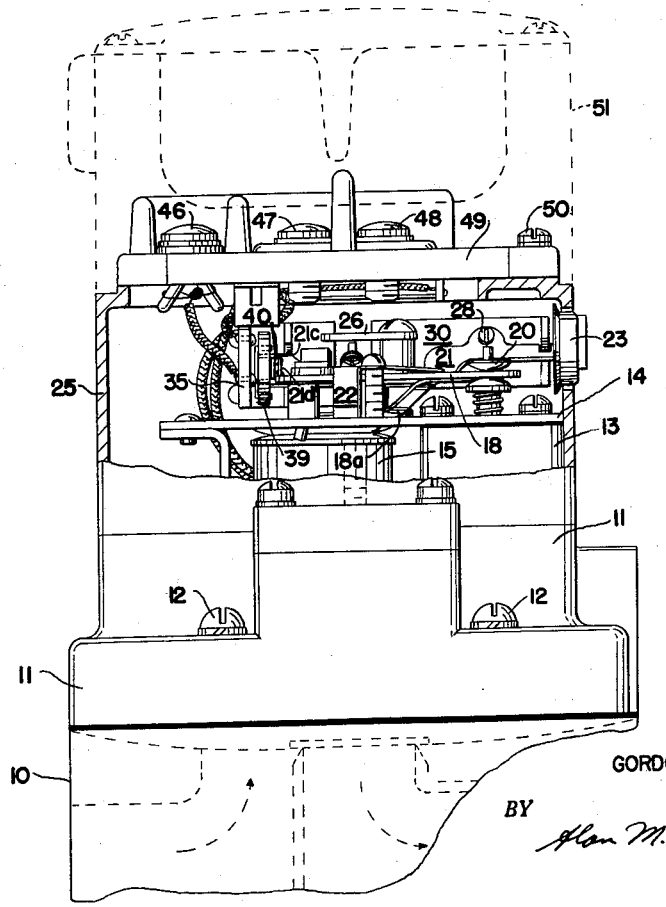
INVENTOR.
GORDON W. DEAN
BY
ATTORNEY Sept. 27, 1960 G. W. DEAN 2,954,204
DIAPHRAGM VALVE
Filed March 23, 1956 2 Sheets-Sheet 2

INVENTOR.
GORDON W. DEAN
BY
Alan M. Staubly
ATTORNEY

United States Patent Office 2,954,204
Patented Sept. 27, 1960

1

2,954,204

DIAPHRAGM VALVE

Gordon W. Dean, Alhambra, Calif., assignor to Minneapolis-Honeywell Regulator Company, Minneapolis, Minn., a corporation of Delaware Filed Mar. 23, 1956, Ser. No. 573,541

4 Claims. (Cl. 251—130)

This invention relates to pressure operated motors and, more particularly, to automatic recycling mechanism to enable manual operation of the pressure motor and which will automatically return to the control of the normal control means for the motor when power is available to operate the controls.

Diaphragm valves, which are controlled by electrically operated pilot valves and which have manually operable automatic recycling means associated therewith, are generally well known in the gas heating controls industry. This invention is directed particularly to improvements in an automatic recycling diaphragm gas valve.

One of the objects of the invention is to provide an improved automatic recycling mechanism for the diaphragm valve disclosed in the copending application of Hugh M. Morgan, entitled "Diaphragm Valve," filed July 21, 1955, Serial No. 523,425, now Pat. No. 2,849,844.

Another object of the invention is to provide in an automatic recycling mechanism, an arrangement wherein the pilot valve actuator is moved by the manual actuating means a little further away from its energized position than it normally assumes in its de-energized condition to provide greater travel for the recycling mechanism and, thus, to provide greater manufacturing tolerances.

Another object of the invention is to provide an automatic recycling mechanism for a pressure operated motor wherein the motor means for the pilot valve does not move partway towards its energized position when the pilot valve is manually moved to the position it assumes when the pilot valve is energized, as in conventional arrangements.

Still another object of the invention is to provide an automatic recycling mechanism for diaphragm valves wherein the manually operable mechanism includes a spring biased over-center means and a switch for the recycling circuit.

A further object of the invention is to provide an automatic recycling mechanism which is of sturdy construction, reliable in operation, and provides relatively wide manufacturing tolerances and, thereby, lower cost.

Still other objects of the invention will become apparent upon reading the following detailed description of the invention in conjunction with the accompanying drawings wherein:

Figure 1 is a side elevational view of a diaphragm valve embodying the invention, with portions thereof broken away and the cover shown in phantom;

Figure 2 is a plan view of the control mechanism with the top portion of the housing therefor shown in cross section;

Figure 3:
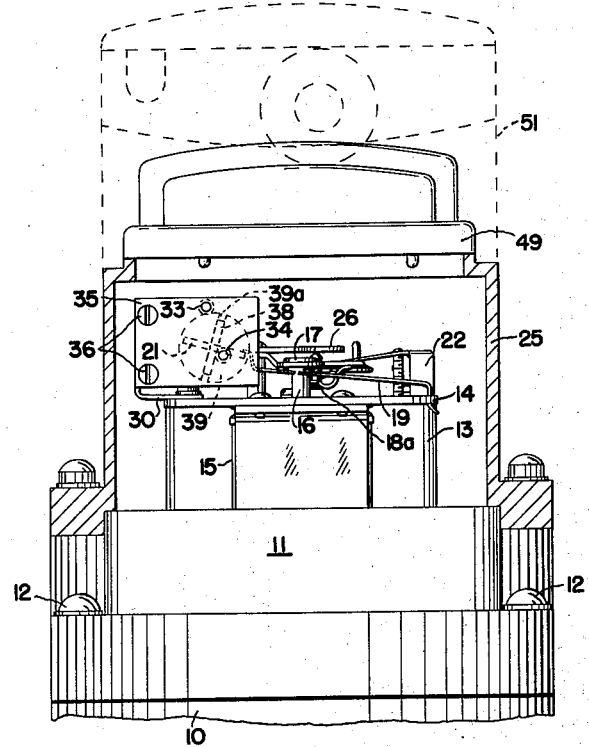
Figure 3 is an end view of the diaphragm valve with the body portion of the valve broken away, the control housing shown in cross section, and the cover shown in phantom.

As the main valve body, the diaphragm controller or pilot valve, and the power means for actuating the pilot valve of this invention form no part of this invention per se, these portions of the device, as illustrated in the drawings, will be described only to such an extent as is necessary for a clear understanding of the invention.

The valve body consists of a lower casting 10 and an upper casting 11 fastened together by bolts 12. Formed in the upper portion of the housing 11 is a diaphragm control valve or pilot valve 13 having a top cover plate 14 that extends beyond the side thereof to support a solenoid 15. The solenoid has a plunger 16 therein which extends through a hole in the plate 14 and terminates in or carries on its upper end a head member 17. The upper end of the plunger also extends through two levers 18 and 19 which are adapted to actuate a pilot valve lever 20 and a manually operated lever 21, respectively. The plunger head 17 is so positioned that upon energization of the solenoid coil, the plunger will be pulled downwardly so as to rock the lever 18 about its downwardly extending pivot arm 18a, against the bias of a leaf spring 22, and thus rock the lever 20 and the diaphragm controller valve (not shown) attached thereto to a position (bleed passage open position) which causes the diaphragm valve to open.

The lever 19 has an upwardly and laterally offset arm portion 19a that is adapted to be engaged by the lever 21 only when the lever 21 is rocked about edge portions 21a and 21b. This is accomplished by a knob 23 secured to one end of the lever 21 and projecting through a hole 24 in the housing which is suitably secured to the upper casting 11. Otherwise, the lever 19 stays in a lowered position so as to not be engaged by either the lever 18 positioned between it and the head 17 of the plunger or by the lever 21. The plunger 17 is prevented from moving completely out of the solenoid tube or coil by means of a stop member 26 secured to the upper casting 11 by a bolt 26a.

The lever 21 also carries a laterally extending arm 27 which has a screw 28 threaded through a hole therein for engagement with an extension 20a of the lever 20 that actuates the pilot valve. It is thus seen that when the lever 21 is rocked by the knob 23 so as to raise the edge of the lever 21, positioned under the offset end of the lever 19, the lever 18 will be bodily lifted at one end by the lever 19 and at the other end by the lever 20, due to the fact that the screw 28 engages and pivots the lever 20 in a direction to cause the diaphragm valve to open. This causes the pivot arm 18a to lift out of contact with the surface of the plate 14 against the bias of spring 22 and to permit the solenoid plunger to be moved a little further outwardly of the solenoid tube than it would normally move under the action of lever 18 when the solenoid is de-energized.

The lever 21 is adapted to be held in its lowered or inoperative position or in its raised or operative position by means of a coiled extension spring 29 extending between a lug on a bracket 30, secured to the upper surface of the casting 11 by bolts 31, and a hole 32 in a laterally offset portion of the lever 21. The spring is so positioned that when the lever 21 is in its lowered position, the axis of the spring is below the line extending between the pivots 21a and 21b of the lever 21. This causes a resilient force to hold the lever 21 in this position unless overcome by manual operation. By rotating the knob 23 against the bias of the spring 29, to throw the axis of the spring above the pivots 21a and 21b, the force of the spring will then be used to hold the lever 21 in its raised position and to hold the diaphragm controller valve in the position that causes the main diaphragm valve to be open.

As the normal travel of the diaphragm controller valve is very slight and as the travel of the plunger of the solenoid would therefore be normally very slight, the raising of the solenoid plunger an additional amount by the lever 21 moving to its upper position, enables the solenoid plunger to move this extra amount in returning the lever 21 to its inoperative position by moving the spring overcenter with respect to the lever pivots. This makes the manufacture of the overcenter mechanism less critical and provides a very satisfactory manual operator for the solenoid valve when there has been a power failure rendering the solenoid useless.

In order to provide for automatically returning the diaphragm valve to the control of the solenoid and the control system in which the solenoid is wired upon power resumption, a pair of contacts 33 and 34 are provided on a panel 35 of insulating material. This panel is secured to the bracket 30 by means of a bolt 36 extending through a spacer sleeve 37 and screw threaded into a threaded hole in bracket 30. Cooperating with these contacts 33 and 34 is a bridging contact bar 38 extending diametrically across the outer surface of a disc of electrically insulating material with the ends of the bar extending through and bent over in notches 39a in the edges of the discs 39. The disc 39 is carried by the inner end of the lever 21 by means of tines 21c projecting from the end of the lever 21 and into holes 41 formed in the disc 39. A coiled compression spring 40 is positioned between the disc 39 and the end of the lever 21 and is retained in position between the tines 21c by means of a third tine 21d. This spring proportionately and resiliently urges the contact bar 38 toward the contacts 33 and 34 and, if the lever 21 is in its raised position, the bar 38 will engage both of these contacts to close a circuit therethrough. When the lever 21 is moved to its lowered position, the bar 38 will disengage from the contact 34 and possibly also the contact 33, depending upon the size of the contacts.

Figure 4:
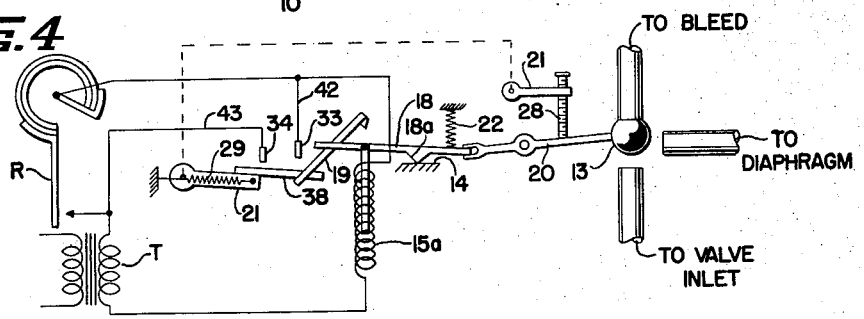
Figure 4 is a schematic showing of the diaphragm controller or pilot valve, the automatic manually operable resetting mechanism and a wiring diagram of the system.
Figure 5:
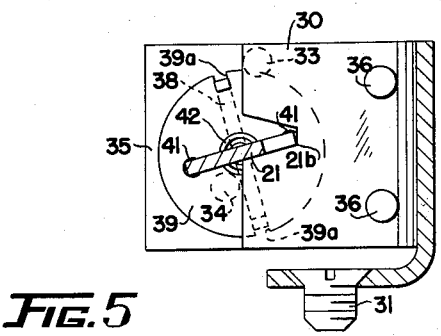
Figure 5 is a cross sectional view taken along the line 5—5 of Figure 2 of the drawing.

The lead wires 42 and 43 from the contacts 33 and 34, respectively, and the lead wires 44 and 45 from the solenoid coil, are each suitably connected, selectively, to one of the terminal members 46, 47, or 48 so as to enable the diaphragm valve to be connected in a control circuit, as shown schematically in Figure 4 of the drawing. Contacts 46, 47, and 48 are mounted on a terminal block 49 of insulating material which is bolted to the top of the housing 25 by bolts 50. A cover 51, shown in phantom in Figures 1 and 3 of the drawing, has suitable openings therein for the reception of lead wires from the other elements of the control system so that these lead wires can likewise be connected to the terminals 46, 47, and 48 in the proper manner.

As can be seen from Figure 4 of the drawing, a room thermostat R is electrically connected in series with the coil of the solenoid operated pilot valve 13 through a transformer T so that the operation of the diaphragm valve is normally controlled by the room thermostat. It will also be noticed that the contacts 33 and 34 and their respective lead lines 42 and 43 are in shunt relationship with respect to the room thermostat so that when the bridging contact 38 is in engagement with the contacts 33 and 34 the circuit is closed through the transformer and the coil of the solenoid regardless of the condition of the room thermostat. Therefore, upon the primary of the transformer becoming energized, the solenoid will cause movement of the lever 18 and, should the lever 21 be in a raised position, the lever 18 will pull the lever 19 and lever 21 down to break the contacts 33 and 34 and thereafter permit the operation of the diaphragm controller valve to be under the control of the room thermostat.

While I have described the preferred embodiment of the invention, it is deemed to be obvious to those skilled in the art that modifications may be made therein without departing from the spirit of the invention. Therefore, the scope of the invention is to be determined from the appended claims.

I claim:

1. A valve comprising a lever pivoted intermediate its ends and carrying a valve at one of its ends and operably connected through a linkage means to a power means at its other end, a crank-like lever rockable on one of its edges along the longitudinal axis thereof and between fixed stops, spring means connected to said crank-like lever for holding said crank-like lever against the stop it is engaging and manually operable means for rocking said crank-like lever between said stops, said crank-like lever having an arm that engages said first mentioned lever to hold said valve open and a crank-like portion that engages said power means and a switch that is closed only when said crank-like lever is in its valve holding open position against one of said stops, said power means and linkage means acting when power is supplied thereto to move said crank-like lever from said one stop to the other stop and to maintain the valve in its open position independently of the crank-like lever.

2. A valve comprising a valve body and a control valve therein, power means operably connected to said control valve, a crank-like lever rockable on one of its edges along the longitudinal axis thereof and between fixed stops, spring means connected to said crank-like lever for holding said crank-like lever against the stop it is engaging and manually operable means for rocking said crank-like lever between said stops, said crank-like lever having an arm that engages said control valve to hold said control valve open and a crank-like portion that engages said power means and a switch that is closed only when said crank-like lever is in its control valve holding open position against one of said stops, said power means when power is supplied thereto to move said crank-like lever from said one stop to the other stop and to maintain the control valve in its open position independently of the crank-like lever.

3. The combination defined in claim 2 wherein said switch includes a pair of fixed contacts and a contact bar mounted on a forked end of said crank-like lever and resiliently biased toward said contacts.

4. A valve comprising a control valve, resilient means normally biasing said control valve to a closed position, a solenoid having a plunger tube and a plunger positioned therein, means operably connecting said plunger to said control valve for actuating said control valve to an open position, and a manually rockable and over-center biased crank-like lever having means engageable with said control valve for independently actuating said control valve to its open position and having means engageable with said plunger for simultaneously moving said plunger slightly outwardly of said tube, said lever being pivoted on its longitudinal axis, a spring biased switch connecting with said rockable and over-center biased crank-like lever so that said switch is closed when said crank-like lever is in its valve open position and is open when said crank-like lever is in its valve closed position.

References Cited in the file of this patent

UNITED STATES PATENTS

| | | |
|---|---|---|
| 2,155,358 | Cyr | Apr. 18, 1939 |
| 2,635,635 | Eimermann | Apr. 21, 1953 |
| 2,661,013 | Eskin | Dec. 1, 1953 |
| 2,699,317 | Ander | Jan. 11, 1955 |
| 2,745,630 | Garner | May 15, 1956 |